Figure 1:
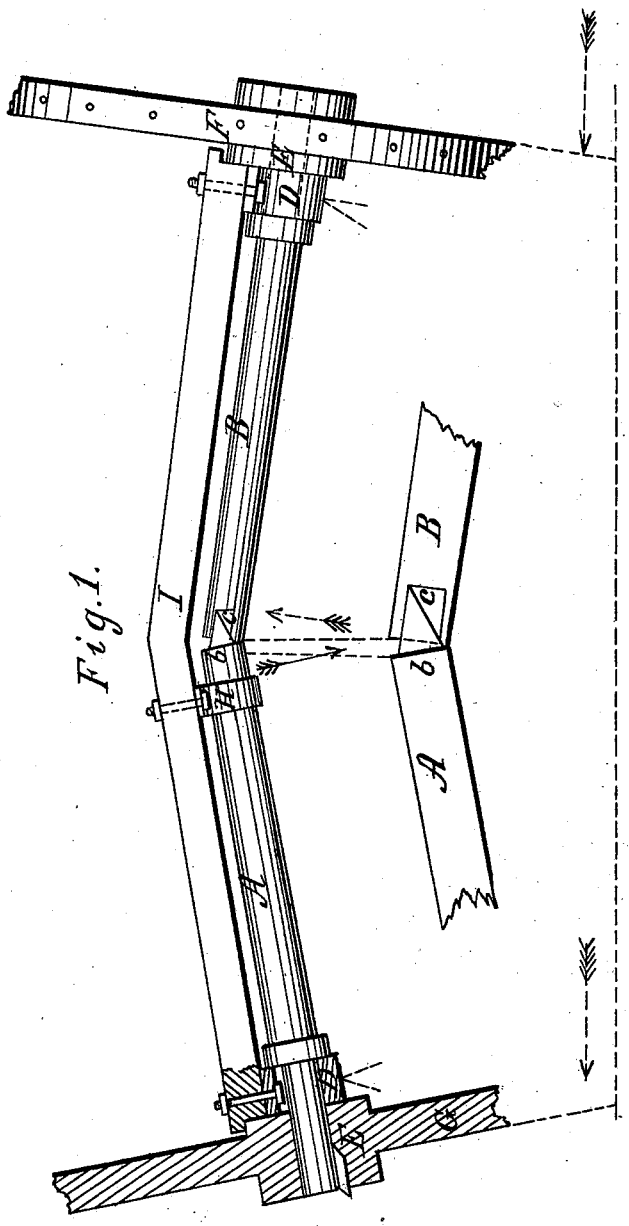

I. SLACK.

Axle-Tree.

No. 4,809.

Patented Oct 10, 1846

UNITED STATES PATENT OFFICE.

ISAAC SLACK, OF AVONDALE, PENNSYLVANIA.

CARRIAGE-AXLE.

Specification of Letters Patent No. 4,809, dated October 10, 1846.

*To all whom it may concern:*

Be it known that I, ISAAC SLACK, of Avondale, in the county of Chester and State of Pennsylvania, have invented a new and Improved Revolving Axle-Tree; and I do hereby declare that the following is a full and exact description.

The nature of my invention consists in reducing the friction and studding the wheel by dividing the revolving axle-tree in two equal parts (at the center) and joining them in an elevated position over the straight line of the center of the wheels, by a tapering pin of the one axle fitting in a straight hole of the other axle-tree, by this arrangement the spokes of the wheels receive the pressure perpendicular.

To enable others skilled in the art to make and use my invention, I will proceed to describe its construction and operation; reference being had to the annexed drawings making a part of this specification, in which—

Figure 1, represents the said revolving intersecting axle-tree; (A) being the revolving axle-tree with the tapering pin (*b*); (B) being the other axle-tree with the straight hole (*c*); (D) the box of the axle near the wheel; (E) the hubs; (F) the rim; (G) the spokes; (H) the middle box near the center, through which the axle (A) revolves; (I) the bed over the revolving axle tree (A & B).

The operation is, when both axles revolve with the same velocity the motion will be equal and no rubbing exists between the parts of the tapering pin (*b*) and the straight hole (*c*) of the axle-tree, but should the body of the wagon be thrown out of level suppose toward (A) the tapering pin (C) would be forced upward, and in the same time the straight hole (*c*) pressed downward in the contrary direction from the same cause, both powers meeting as the pin (*b*) and hole (*c*) in contrary directions will be equalized by which the friction reduced on the middle box (H) and other parts of the axle.

It has been proved in practice that a wagon arranged on the above described principle—by a divided revolving axle-tree and provided with the tapering pin (*b*) and straight hole (*c*) has the advantage in reducing the friction considerably and insuring more stability to carriages than any other mode now in practice.

What I claim as my invention and desire to secure by Letters Patent, is—

In particular, the revolving axles coming together intersecting and elevated above the straight line of the center of the wheels, in combination with a straight hole in one and a tapering pin in the other for the use and purpose as described in the specification and illustrated by the drawings.

ISAAC SLACK.

Witnesses:
PETER VON SCHMIDTS,
JNO. W. THAYER.